Figure 1:
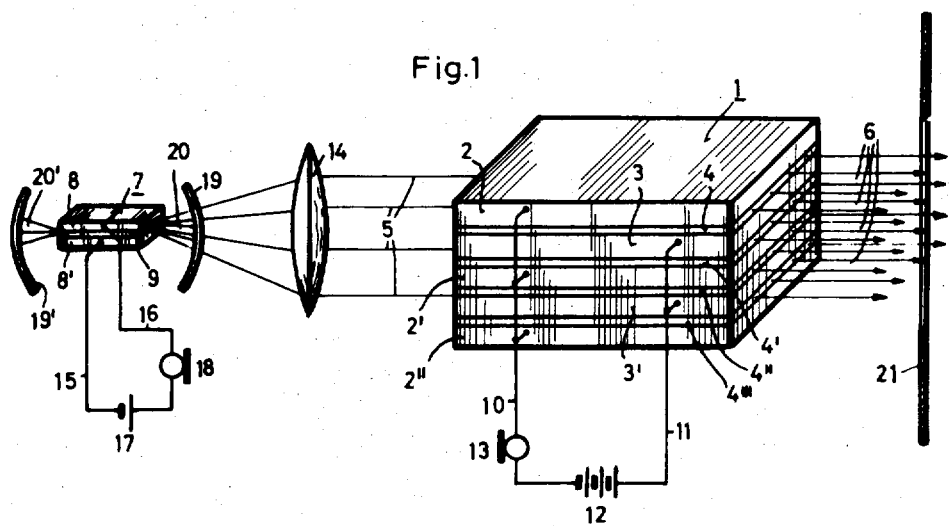

United States Patent

Heywang

[15] 3,704,427
[45] Nov. 28, 1972

[54] DEVICE FOR STIMULATING EMISSION OF RADIATION FROM A DIODE

[72] Inventor: Walter Heywang, Munich, Germany

[73] Assignee: Siemens & Halske Aktiengesellschaft, Berlin, Germany

[22] Filed: June 3, 1964

[21] Appl. No.: 372,199

[30] Foreign Application Priority Data

June 7, 1963 Germany..................S 85580

[52] U.S. Cl..................................331/94.5, 330/4.3
[51] Int. Cl................................................H01s 3/18
[58] Field of Search.....................330/4.3; 331/94.5

[56] References Cited

UNITED STATES PATENTS

| | | | |
|---|---|---|---|
| 3,514,715 | 5/1970 | Kosonocky | 331/94.5 |
| 3,431,513 | 3/1969 | Nannichi | 331/94.5 |
| 3,309,553 | 3/1967 | Kroemer | 331/94.5 |
| 3,312,905 | 4/1967 | Lewis | 330/4.3 |
| 3,353,114 | 11/1967 | Hanks et al. | 331/94.5 |

Primary Examiner—Roy Lake
Assistant Examiner—Darwin R. Hostetter
Attorney—Curt M. Avery

[57] ABSTRACT

A device for stimulated emission of radiation utilizes a semiconductor body having a plurality of transition layers of i conductivity type parallel to each other and having opposite edges. When the body is electrically excited to stimulate radiation by charge-carrier in the layers and radiation is applied to one corresponding edge of the layers, amplified coherent tightly bunched beams are emitted by the transition layers at the other corresponding edge thereof.

23 Claims, 2 Drawing Figures

PATENTED NOV 28 1972  3,704,427

DEVICE FOR STIMULATING EMISSION OF RADIATION FROM A DIODE

DESCRIPTION OF THE INVENTION

My invention relates to a device for the generation or amplification of microwave energy in the electrical and optical spectra by stimulated emission of radiation, such device usually being known as "maser" or "laser", the latter term being applied to generation or amplification of radiation in or near the optical spectrum.

The physical phenomena resulting in the amplification or generation of short-wave radiation in the centimeter and millimeter wavelength spectra or in the region of optical radiation, as well as various active maser and laser materials and devices suitable for such purposes, are generally known. Briefly, the amplification or generation of coherent radiation in a maser-active material is effected by induced emission stimulated by radiation of the same wavelength into the active material or already contained therein. The energy required for amplifying the radiation results from an inversion in the charge carrier population of the energy levels of the active material. The charge carriers may be electrons, holes or ions. This inversion is caused by energy supplied from the outside, for example by irradiating or "pumping" optical light into the active material, or by injecting electric charge carriers, such as electrons or holes, into a p-n junction semiconductor. In many cases, particularly those of masers which amplify or generate optical radiation, known as lasers, the stimulating energy reverses the electron population of the energy levels. The induced emission then corresponds to stimulated transition of electrons from a higher energy level to a lower energy level such as the ground state.

A number of laser or maser devices operating with gaseous, liquid or solid active materials, which operate in accordance with the aforementioned principle, are known. The radiation energy produced or amplified by such devices is small. There are fundamental reasons for such limitation. For example, in the normally diluted gas of a gas laser there obtains an only slight density of the atoms that are excited to conditions resulting in laser-active transitions. To mention another example, in a ruby laser, the required pumping radiation when using the known light sources for this purpose is disproportionately high, primarily due to the fact that the share of energy active for the pumping process in a ruby laser is very little compared to the energy demand. For these reasons, devices such as, for example, known gas lasers and ruby lasers have not been operated successively in practice to produce the continuous power requirement of appreciably more than one watt.

Although laser devices are known which are capable of producing energies up to megawatts for short intervals of time, for example $10^{-6}$ and $10^{-7}$ second, this energy can be furnished only momentarily with long intermediate intervals of idling time. The energy issued during one second, for example, thus remains in the order of $10^{-2}$ to 1 wattsec., for example.

It is an object of my invention to provide a device for generating or amplifying maser or laser radiation which is capable of issuing a considerably higher energy output.

The term "energy output" relative to a laser in the sense of the present disclosure denotes the provision of energy per unit time, which when calculated for a period of energy delivery longer than about one second, results in continuous operation of the laser device.

With respect to high energy output of a maser or laser, devices operating with semiconductors, also called injection lasers or diode lasers, are more advantageous than devices utilizing ruby crystals and similar laser-active materials whose electrical conductivity is slight or negligibly small at those temperatures which must be maintained for laser operation. Such lasers are described in an article entitled "Injection Lasers" by Marshall I. Nathan and Gerald Burns, Electronics, Dec. 6, 1963, pages 61 to 65, and an article entitled "Injection-Laser Systems" by C. M. Johnson, Electronics, Dec. 13, 1963, pages 34 to 39.

By virtue of the conductance of the semiconducting material, injection lasers afford an exceptionally high efficiency in the supply of energy required for obtaining the aforementioned inversion. This operation is achieved by charge-carrier injection into a p-n junction, for example, in properly selected semiconductor materials having suitable doping. For thus improving the efficiency of the "pumping" process, it is necessary that the selected semiconductor materials be laser-active, at least in certain regions. That is, they must have regions in which they can be made laser-active by the pumping process. Such semiconductor substances may be, for example, gallium arsenide, mixed crystals of gallium arsenide, phosphide, indium antimonide, indium arsenide and others.

Instead of being active in the aforementioned p-n junction layer, the pumping process may also be made active in the transition layer between regions having a different dopant concentration of the same type with respect to the conductance caused by the dopant, and/or the pumping action may also be carried out in regions adjacent to the mentioned junction or transition layers. It has also been proposed to use a laser-active semiconductor body in which between a p and n region one or more layers are provided that have a reduced dopant concentration with respect to the adjacent, more strongly doped region. More particularly, an intrinsically conductive region or i type region may be located between the p and n regions. The latter devices are laser-active predominantly in the weakly doped region.

With the aforementioned semiconductor lasers, it is as a rule not a difficult problem to provide the high charge carrier injection needed for the energy level inversion that results in the provision of high laser radiation output. However, it is difficult to prevent the temperature from exceeding the maximum permissible value for laser operation in the laser-active region of the semiconductor. The amount of heat produced is predominantly caused by electric losses, but is also due to those losses which result from radiation-free transitions in the semiconductor.

Although in known injection laser devices considerably increased energy densities have been attained, in comparison with ruby lasers, for example, their energy output presently is not higher than approximately 1 watt. This is because the laser-active zone proper in a diode laser is very small. Its maximal thickness is essentially determined by the diffusion length of the charge carriers in the semiconductor material. Although the diffusion length depends upon the doping and the impressed current density, thicknesses of more than 10 microns of the active region are hardly attainable. In known devices, the thickness of the laser-active zone not only limits the radiation energy of the laser, but also the outlet opening for the laser radiation and hence the maximally attainable parallelism of the rays in the bunched beam. An appreciable widening of the laser-active region in a radiation generator operating on the laser principle does not appear to offer advantages in the known devices, because with a very wide beam too many modes occur and sufficient reliability with respect to coherence of the generated or amplified radiation over the entire cross section is no longer attained.

It is therefore another object of my invention to afford an increase in radiation energy of a diode device for stimulated emission of radiation, while requiring no increase, or even permitting a decrease, in the energy density of the pumping energy supplied to the diode, and to simultaneously attain a good bunching of the generated coherent microwaves or light radiation within a beam divergence of about 4° or less in at least one of the two coordinate directions perpendicular to the beam direction.

Another object of my invention is to provide a laser device which additionally is capable of providing a radiation of approximately 1 watt or more without foregoing the other objectives desired.

To achieve these objects, and in accordance with a feature of my invention, the device for emitting a stimulated radiation, more particularly coherent microwave or light radiation, is provided with a semiconductor body that possesses two or more transition or junction layers which are arranged parallel to each other and in which radiation is generated or amplified on the diode-laser principle, the radiation provided by these layers and out of the semiconductor body being in a direction substantially parallel to the planes of the layers in the form of a tightly bunched beam.

Figure 2:
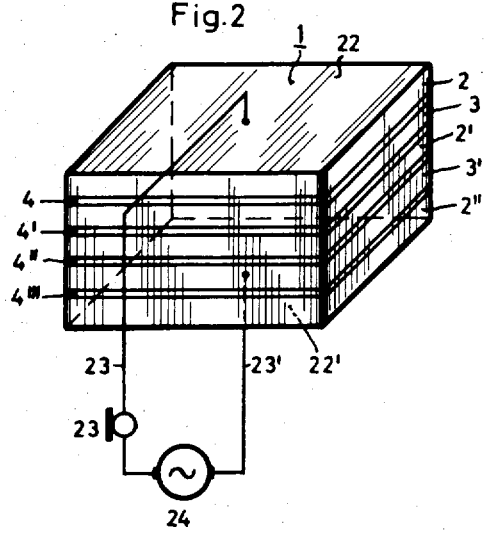

The aforementioned objects, advantages and features of the invention, said features being set forth with particularity in the claims annexed hereto, will be apparent from the following description in conjunction with embodiments of laser devices according to the invention illustrated by way of example in the accompanying drawing, in which:

FIG. 1 is a partly schematic, partly side view, perspective view of an embodiment of an optical laser device of the invention; and FIG. 2 is a partly schematic, perspective view of another embodiment of the laser device of the invention.

In FIG. 1, a crystalline semiconductor body 1 of gallium arsenide or GaAs is composed alternately of n type regions providing electron conductance and p type regions providing hole conductance. The n type regions are denoted by 2, 2' and 2'' and the p type regions are denoted by 3 and 3'. The junction layers located between these regions are denoted by 4, 4', 4'' and 4'''. They constitute the aforementioned laser-active layers of the crystal.

The semiconductor body is preferably of substantially block configuration with top and bottom faces spaced from each other and substantially parallel to the regions 2 and 3 and the layers 4 and to each other and with a first pair of spaced substantially parallel sides perpendicular to the top and bottom faces and a second pair of spaced substantially parallel sides perpendicular to the first pair of sides and to the top and bottom faces. The semiconductor body, of course, need not be of rectangular block form, but may be of any suitable configuration, such as, for example, with sides which are angularly disposed and indented rather than at right angles with the other sides or top and bottom faces.

Current leads 10 and 11 of an external injection circuit connect a current source 12 to the regions 2, 2' and 2'' and 3, 3' to inject charge carriers into these regions at one of the second pair of sides of the body 1. The external circuit is provided with a device 13, such as, for example, a microphone, by means of which the injection current can be modulated for the purpose of modulating the radiated output energy of the laser device.

A beam of parallel radiation 5 entering into the crystalline semiconductor body 1 at one of the first pair of sides of said body and amplified in the layers 4, 4', 4'' and 4''' is emitted by the layers at the other of the first pair of sides as amplified parallel radiation 6. The portion of radiation 6 generated in the individual layers 4, 4', 4'' and 4''' has a fixed phase relation to the portion of radiation 5 entering into the respective active layers. That is, the radiation provided by the individual active layers is coherent with respect to the corresponding portion of the entering radiation 5.

The radiation 5 may already be coherent. That is, the radiation 5 may constitute a radiation in which the portions entering into the layers 4, 4', 4'' and 4''' have a fixed phase relation to each other. In such a case, the portions of the amplified radiation 6 emitted by the individual layers 4, 4', 4'' and 4''' are likewise coherent, having a fixed phase relation to each other. Consequently, due to interference of the radiating portions provided by the individual layers 4, 4', 4'' and 4''', the beam 6 emitted by the crystalline body 1 has a particularly good parallelism, aside from any occurring side radiations which may be readily separated from the main portion of radiations. Such separation may be accomplished, for example, by a diaphragm 21. The diaphragm 21 may be provided with a large opening so that it has no refracting effect upon the radiation of the main portion of radiations.

When the entering radiation 5 is coherent in itself, then the amplification by stimulated emission has the effect that the emitted radiation 6 is particularly well bunched due to the proper size of the diaphragm opening in the direction of the layer width, perpendicular to the radiating direction in the layer plane. Generally, the emitted radiation 6 has a higher energy content than the entering radiation 5.

If desired, the device comprising the crystal structure 1, including the regions 2 and 3 and the layers 4 and the circuit components 10 to 13 may be provided with components which are non-reciprocal with respect to radiation. The device is then applicable, for example, as a selective amplifier of high output power and/or good bunching to be inserted into a communication or signal transmission path. The low-intensity radiation 5 produced by epitaxially precipitating upon a monocrystalline substrate the desired sequence of layers in the manner generally known for the production of electronic p-n junction devices.

I claim:

1. In a device for stimulated emission of radiation from a diode in the form of a tightly bunched beam,
 a semiconductor body having a plurality of transition layers parallel to each other and having opposite edges; and
 electric excitation means connected to said body for stimulating radiation by charge-carrier in said layers, said transition layers emitting at one corresponding edge amplified coherent tightly bunched beams when coherent radiation is applied to the other corresponding edge of said layers, the beam issuing direction from said layers being substantially parallel to said layers.

2. In a device for stimulated emission of radiation from a diode in the form of a tightly bunched beam of not more than about 4 degrees divergence in at least one of the two coordinate directions perpendicular to the beam direction;
 a semiconductor body having a plurality of transition layers parallel to each other and having opposite edges; and
 electric excitation means connected to said body for stimulating radiation by charge-carrier in said layers, said transition layers emitting at one corresponding edge amplified coherent tightly bunched beams when coherent radiation is applied to the other corresponding edge of said layers, the beam issuing direction from said layers being substantially parallel to said layers.

3. In a device for stimulated emission of radiation from a diode in a tightly bunched beam,
 a semiconductor body having a plurality of transition layers substantially parallel to each other, said semiconductor body having top and bottom faces spaced from each other and substantially parallel to said layers and to each other, a first pair of sides spaced from each other and transverse to said top and bottom faces, and a second pair of sides spaced from each other and transverse to said top and bottom faces, each of said layers having one edge in one of the second pair of sides and an opposite edge in the other of said second pair of sides; and
 electric excitation means connected to one of the first pair of sides of said body for stimulating radiation by charge-carrier in said layers, said transition layers emitting at at least one of the second pair of sides amplified coherent tightly bunched beams in a direction substantially parallel to said layers when coherent radiation is applied to the other of said second pair of sides.

4. A device for stimulated emission of radiation from a diode in a tightly bunched beam, comprising
 a semiconductor body having a plurality of transition layers substantially parallel to each other, said semiconductor body having a substantially block configuration with top and bottom faces spaced from each other and substantially parallel to said layers and to each other and with a first pair of spaced substantially parallel sides perpendicular to said top and bottom faces and a second pair of spaced substantially parallel sides perpendicular to said first pair of sides and to said top and bottom faces;
 auxiliary means for supplying radiation to one of the first pair of sides of said semiconductor body; and
 electric excitation means for supplying electric currents to said semiconductor body at one of the second pair of sides thereof to stimulate radiation in said layers in accordance with the injection-laser principle whereby radiation is emitted by said layers at the other of said first pair of sides of said semiconductor body.

5. A device for stimulated emission of radiation from a diode in a tightly bunched beam, comprising
 a semiconductor body having a plurality of transition layers substantially parallel to each other, said semiconductor body having a substantially block configuration with top and bottom faces spaced from each other and substantially parallel to said layers and to each other and with a first pair of spaced substantially parallel sides perpendicular to said top and bottom faces and a second pair of spaced substantially parallel sides perpendicular to said first pair of sides and to said top and bottom faces;
 auxiliary means for supplying radiation substantially perpendicularly to one of the first pair of sides of said semiconductor body; and
 electric excitation means for supplying electric currents to said semiconductor body at one of the second pair of sides thereof to stimulate radiation in said layers in accordance with the injection-laser principle whereby radia-tion coherent with the radiation supplied to said semicon-ductor body is emitted by said layers at the other of said first pair of sides thereof substantially parallel to said radiation supplied to said semiconductor body.

6. A laser device as claimed in claim 4, wherein the radiation supplied to said semiconductor body is coherent with the radiation emitted by the layers of said semiconductor body and has the same frequency as the emitted radiation.

7. A laser device as claimed in claim 4, comprising diaphragm means positioned in the radiation emitted from the layers of said semiconductor body for concentrating said emitted radiation.

8. A device for stimulated emission of radiation from a diode in a tightly bunched beam, comprising
 a semiconductor body having a plurality of regions of alternate opposite conductivity type and transition layers interposed between respective adjacent regions of opposite conductivity type, said regions and transition layers being substantially parallel to each other, said semiconductor body having a substantially block configuration with top and bottom faces spaced from each other and substantially parallel to said layers and to each other and with a first pair of spaced substantially parallel sides perpendicular to said top and bottom faces and a second pair of spaced substantially parallel sides perpendicular to said first pair of sides and to said top and bottom faces;
 auxiliary means for supplying radiation to one of the first pair of sides of said semiconductor body; and thus enters into the semiconductor body 1 and is emitted by said body in amplified and coherent relation as a beam 6 of high energy and/or improved bunching.

For producing coherent output radiation of high energy and/or good bunching, the device of FIG. 1 is provided with additional components. The radiation 5 entering into the semiconductor 1 is produced with the aid of an auxiliary injection laser diode 7. The laser diode 7 has two regions 8 and 8' of mutually opposed conductance type. The laser crystal 7 may comprise germanium or gallium arsenide, for example. With respect to details of such lasers, reference may be had to the aforementioned literature or to the copending application for maser device of G. Winstel et al., Ser. No. 345,658, filed Feb. 18, 1964, and assigned to the assignee of the present invention.

Coherent radiation is produced by stimulated emission in the p-n junction layer 9 of the crystal 7. The radiation is bunched by a collector lens 14 to furnish the coherent input radiation 5 for the semiconductor body 1. For obtaining coincident frequencies, it is preferable to utilize for the regions 8 and 8' of the auxiliary laser diode 7 the same materials as for the regions 2 and 3 of the crystalline body 1. Charge carriers are injected into the crystal 7 through current leads 15 and 16 from a current source 17 to effect the aforementioned inversion of the charge carrier population on the energy levels. The injection circuit may contain a modulator such as, for example, a microphone 18 for modulating the radiation 5, if desired.

The device of FIG. 1 provides a beam of particularly good parallelism in the form of a tightly bunched coherent radiation of high energy superior to the beam of radiation attainable with injection lasers of known type. An example of a known type is the auxiliary laser device 7 of FIG. 1. As mentioned, the bunching is particularly intense in the direction of the layer thickness.

For producing coherent laser radiation with the device of FIG. 1, care must be taken that no self-excitation of the laser radiation occurs in the layers 4, 4', 4'' and 4''', in contrast to the p-n junction layer 9 of the auxiliary laser 7. As a rule, this can be achieved by limiting the electric current flowing through the device. In order to obtain self-excitation in the junction layer 9 of the auxiliary laser 7, even with relatively low currents, for example, it is advisable to utilize reflection surfaces 19 and 19'. The reflection surfaces 19 and 19' are arranged on both sides of the laser crystal 7 so that the radiation 20 and 20' generated in the junction layer 9 is reflected back into itself and thus passes several times through the junction layer 9 in accordance with the quality of the laser device.

Only a portion of the radiation impinging upon the reflector 19 is emitted as radiation 5 by the laser arrangement 7, 19, 19'. While in FIG. 1 the reflection surfaces 19 and 19' are shown separate from the laser crystal 7, they are generally located at the end faces of said crystal. Generally employed for this purpose are reflective dielectric coatings. In some cases, it is only necessary to polish the end faces of the crystal 7 that are impinged upon by the radiations 20 and 20', because the polished surfaces may then be sufficiently reflective for self-excitation due to the high dielectric constant of the semiconductor material.

In many cases it is preferable that those surfaces of the semiconductor body that intersect the laser-active layers but through which no laser radiation is to enter into or be emitted from the semiconductor body, extend at an angle to the laser-active layers so that these surfaces do not reflect into the layers any radiation extending within the layers. To avoid radiation losses, it is further advisable to make such sloping or inclined crystal surfaces reflective. A more detailed description and an illustration of laser crystals with surfaces extending at an angle of inclination to the radiation-entering and emitting faces may be found in copending application Ser. No. 223,203, filed Sept. 12, 1962, of H. Rother and W. Heywang for Optical Amplifier With a Laser Monocrystal, assigned to the assignee of the present invention.

The semiconductor body 1 containing the regions 2 and 3 and the layers 4, may also be used alone as a radiation generator, conjointly with the appertaining circuit components 10 to 12. In this case, care must be taken that self-excitation of the radiation occurs in the layers 4, 4' 4'' and 4'''. This is achieved in known manner and as hereinbefore described with reference to the auxiliary laser device 7, if the radiation in the layers 4, 4', 4'' and 4''' is caused to repeatedly travel back and forth between mutually parallel reflective surfaces. In FIG. 1, this would be the surfaces through which the radiation enters into or is emitted from the body 1. That is, the latter two faces or first pair of sides of the body 1 would have to be provided with reflectors as hereinbefore described, the reflector located on the side of the emitted beam 6 being semi-transparent to permit the passage of the beam.

With a suitable modification of the electric circuitry, the device according to the invention may also be operated with alternating current. The embodiment of FIG. 2 exemplifies this mode of performance.

In FIG. 2, a crystalline semiconductor body 1 corresponds to the body 1 described with reference to FIG. 1. On the top face 22 and the corresponding bottom face 22', the crystalline body 1 is provided with respective electrodes or electrical conductors which are connected to current supply leads 23 and 23'. The leads 23 and 23' supply current from an alternating-current generator 24. The circuit may include a modulating device such as, for example, a microphone 25. For a given flow direction of the current, the sequence of p-n junctions in the semiconductor body 1 between regions of mutually opposed conductance type are alternately poled in the forward and blocking directions, respectively. The junction layer, which at any moment is poled in the forward direction, acts as a laser-active material in the manner described with reference to FIG. 1, whereas the junction layer then poled in the reverse direction constitutes a capacitive reactance with respect to the alternating current. Consequently, when the device is operated with alternating current, the layers disposed above one another in the semiconductor 1 and electrically connected in series, operate alternately as a laser-active region or as a capacitance, depending upon the phase of the alternating current.

Semiconductor bodies suitable for the purpose of the invention and comprising a plurality of layers having respectively different dopant concentration and/or of respectively different conductance type may be electric excitation means for supplying electric currents to said regions of said semiconductor body at one of the second pair of sides thereof to stimulate radiation in the transition layers whereby radiation is emitted by said transition layers at the other of said first pair of sides of said semiconductor body.

9. A laser device as claimed in claim 8, wherein said transition layers have a lower dopant concentration than the adjacent regions.

10. A laser device as claimed in claim 8, wherein said regions are of alternately n conductivity type and p conductivity type, and said transition layers are of $i$ conductivity type.

11. A laser device as claimed in claim 8, wherein said regions have a high dopant concentration and said transition layers have a low dopant concentration.

12. A device for stimulated emission of radiation from a diode in a tightly bunched beam, comprising
a semiconductor body having a plurality of regions of alternate opposite conductivity type and transition layers interposed between respective adjacent regions of opposite conductivity type, said regions and transition layers being substantially parallel to each other, said semiconductor body having a substantially block configuration with top and bottom faces spaced from each other and substantially parallel to said layers and to each other and with a first pair of spaced substantially parallel sides perpendicular to said top and bottom faces and a second pair of spaced substantially parallel sides perpendicular to said first pair of sides and to said top and bottom faces;
auxiliary means for supplying radiation to one of the first pair of sides of said semiconductor body; and
electric excitation means for supplying electric currents to said regions of said semiconductor body at one of the second pair of sides thereof to stimulate radiation in the transition layers whereby radiation is emitted by said transition layers at the other of said first pair of sides of said semiconductor body, said electric excitation means comprising a source of direct-current voltage having a positive pole and a negative pole, first electrical conducting means connecting the negative pole of said voltage source to odd numbered ones of said regions counting from the top face of said semiconductor body, and second electrical conducting means connecting the positive pole of said voltage source to even numbered ones of said regions counting from said top face.

13. A device as claimed in claim 12, wherein said regions are alternately of n conductivity type and p conductivity type and wherein said first electrical conducting means is connected to regions of n conductivity type and said second electrical conducting means is connected to regions of $p$ conductivity type.

14. A device for stimulated emission of radiation from a diode in a tightly bunched beam, comprising
a semiconductor body having a plurality of transition layers substantially parallel to each other, said semiconductor body having a substantially block configuration with top and bottom faces spaced from each other and substantially parallel to said layers and to each other and with a first pair of spaced substantially parallel sides perpendicular to said top and bottom faces and a second pair of spaced substantially parallel sides perpendicular to said first pair of sides and to said top and bottom faces;
auxiliary means for supplying radiation to one of the first pair of sides of said semiconductor body, said auxiliary means comprising a laser diode means positioned to direct coherent radiation substantially parallel to said transition layers to said one of said first pair of sides of said semiconductor body; and
electric excitation means for supplying electric currents to said semiconductor body at one of the second pair of sides thereof to stimulate radiation in said layers in accordance with the injection-laser principle whereby radiation is emitted by said layers at the other of said first pair of sides of said semiconductor body, the radiation supplied to said semiconductor body being in phase with the radiation emitted by the layers of said semiconductor body.

15. A device for stimulated emission of radiation from a diode in a tightly bunched beam, comprising
a semiconductor body having a plurality of regions of alternate opposite conductivity type and transition layers interposed between respective adjacent regions of opposite conductivity type, said regions and transition layers being substantially parallel to each other, said semiconductor body having a substantially block configuration with top and bottom faces spaced from each other and substantially parallel to said layers and to each other and with a first pair of spaced substantially parallel sides perpendicular to said top and bottom faces and a second pair of spaced substantially parallel sides perpendicular to said first pair of sides and to said top and bottom faces;
auxiliary means for supplying radiation to one of the first pair of sides of said semiconductor body; and
electric excitation means for supplying electric currents to said semiconductor body at the top and bottom faces thereof to stimulate radiation in the transition layers whereby radiation is emitted by said transition layers at the other of said first pair of sides of said semiconductor body, said electric excitation means comprising a source of alternating current voltage having two terminals, first electrical conducting means connecting one terminal of said voltage source to the top face of said semiconductor body, and second electrical conducting means connecting the other terminal of said voltage source to the bottom face of said semiconductor body.

16. A device for stimulated emission of radiation from a diode in a tightly bunched beam, comprising
a semiconductor body having a plurality of transition layers substantially parallel to each other, said semiconductor body having a substantially block configuration with top and bottom faces spaced from each other and substantially parallel to said layers and to each other and with a first pair of spaced substantially parallel sides perpendicular to said top and bottom faces and a second pair of spaced substantially parallel sides perpendicular to said first pair of sides and to said top and bottom faces;

self-excitation means positioned in operative proximity with each of the first pair of sides of said semiconductor body for providing self-excitation thereof; and electric excitation means for supplying electric currents to said semiconductor body at one of the second pair of sides thereof to stimulate radiation in said layers in accordance with the injection-laser principle whereby radiation is emitted by said layers at both of said first sides of said semiconductor body and is reflected back to said semiconductor body by said self-excitation means.

17. A device for stimulated emission of radiation from a diode in a tightly bunched beam, comprising a semiconductor body having a plurality of regions of alternate opposite conductivity type and transition layers interposed between respective adjacent regions of opposite conductivity type, said regions and transition layers being substantially parallel to each other, said semiconductor body having a substantially block configuration with top and bottom faces spaced from each other and substantially parallel to said layers and to each other and with a first pair of spaced substantially parallel sides perpendicular to said top and bottom faces and a second pair of spaced substantially parallel sides perpendicular to said first pair of sides and to said top and bottom faces;

self-excitation means positioned in operative proximity with each of the first pair of sides of said semiconductor body for providing self-excitation thereof; and electric excitation means for supplying electric currents to said regions of said semiconductor body at one of the second pair of sides thereof to stimulate radiation in the transition layers whereby radiation is emitted by said transition layers at both of said first sides of said semiconductor body and is reflected back to said semiconductor body by said self-excitation means.

18. A device for stimulated emission of radiation from a diode in a tightly bunched beam, comprising a semiconductor body having a plurality of regions of alternate opposite conductivity type and transition layers interposed between respective adjacent regions of opposite conductivity type, said regions and transition layers being substantially parallel to each other, said semiconductor body having a substantially block configuration with top and bottom faces spaced from each other and substantially parallel to said layers and to each other and with a first pair of spaced substantially parallel sides perpendicular to said top and bottom faces and a second pair of spaced substantially parallel sides perpendicular to said first pair of sides and to said top and bottom faces;

self-excitation means positioned in operative proximity with each of the first pair of sides of said semiconductor body for providing self-excitation thereof; and electric excitation means for supplying electric currents to said regions of said semiconductor body at one of the second pair of sides thereof to stimulate radiation in the transition layers whereby radiation is emitted by said transition layers at both of said first sides of said semiconductor body and is reflected back to said semiconductor body by said self-excitation means, said electric excitation means comprising a source of direct-current voltage having a positive pole and a negative pole, first electrical conducting means connecting the negative pole of said voltage source to odd numbered ones of said regions counting from the top face of said semiconductor body, and second electrical conducting means connecting the positive pole of said voltage source to even numbered ones of said regions counting from said top face.

19. A device as claimed in claim 18, wherein said regions are alternately of n conductivity type and p conductivity type and wherein said first electrical conducting means is connected to regions of $n$ conductivity type and said second electrical conducting means is connected to regions of $p$ conductivity type.

20. A device for stimulated emission of radiation from a diode in a tightly bunched beam, comprising a semiconductor body having a plurality of regions of alternate opposite conductivity type and transition layers interposed between respective adjacent regions of opposite conductivity type, said regions and transition layers being substantially parallel to each other, said semiconductor body having a substantially block configuration with top and bottom faces spaced from each other and substantially parallel to said layers and to each other and with a first pair of spaced substantially parallel sides perpendicular to said top and bottom faces and a second pair of spaced substantially parallel sides perpendicular to said first pair of sides and to said top and bottom faces;

self-excitation means positioned in operative proximity with each of the first pair of sides of said semiconductor body for providing self-excitation thereof; and electric excitation means for supplying electric currents to said semiconductor body at the top and bottom faces thereof to stimulate radiation in the transition layers whereby radiation is emitted by said transition layers at the other of said first pair of sides of said semiconductor body, said electric excitation means comprising a source of alternating current voltage having two terminals, first electrical conducting means connecting one terminal of said voltage source to the top face of said semiconductor body, and second electrical conducting means connecting the other terminal of said voltage source to the bottom face of said semiconductor body.

21. In a device as claimed in claim 1, wherein each of said transition layers is of $i$ conductivity type.

22. In a device as claimed in claim 3, wherein each of said transition layers is of $i$ conductivity type.

23. A semiconductor device comprising:

a stack of layers of semiconductor material, each of said layers being of a conductivity type opposite to that of an adjacent layer in said stack, said layers forming at least three substantially parallel, PN junctions, said stack having a pair of opposite ends which are substantially only light-transmitting, and a pair of electrical contact means on a pair of opposite surfaces, respectively, of said stack, substantially parallel to said PN junctions for sending current through said stack, whereby to cause alternate ones of said PN junctions to be forward biased by current of predetermined amplitude in one direction and to produce a region of population inversion and stimulated emission of radiation adjacent each forward-biased, PN junction whereby said semiconductor device may function as an amplifier of light directed through said ends.

* * * * *